United States Patent
Meyer et al.

(10) Patent No.: US 6,631,396 B2
(45) Date of Patent: *Oct. 7, 2003

(54) PROCESS AND ELECTRONIC DATA-PROCESSING SYSTEM FOR COMMUNICATION WITH AT LEAST ONE OTHER ELECTRONIC DATA-PROCESSING SYSTEM

(75) Inventors: Rolf Meyer, Wennigsen (DE); Axel Haupt, Langenhagen (DE)

(73) Assignee: Sennheiser Electronic GmbH & Co. KG, Wedemark (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/247,717

(22) Filed: Feb. 9, 1999

(65) Prior Publication Data

US 2002/0165904 A1 Nov. 7, 2002

(30) Foreign Application Priority Data

Feb. 16, 1998 (DE) .......................... 198 06 237

(51) Int. Cl.[7] .............................. G06F 15/16
(52) U.S. Cl. ............... 709/203; 709/200; 709/231; 709/232; 707/10; 707/103; 707/104; 707/3
(58) Field of Search .................. 709/217, 203, 709/200, 231, 232; 455/419, 433, 418; 707/10, 103, 104, 3; 710/72, 74; 717/11; 711/171, 172

(56) References Cited

U.S. PATENT DOCUMENTS

| | | | | |
|---|---|---|---|---|
| 5,416,905 A | | 5/1995 | Mori et al. | 709/202 |
| 5,684,859 A | * | 11/1997 | Chanroo et al. | 455/433 |
| 5,867,781 A | * | 2/1999 | Hofmann | 455/419 |
| 5,978,833 A | * | 11/1999 | Pashley et al. | 709/200 |
| 6,119,180 A | * | 9/2000 | Terho et al. | 710/72 |
| 6,138,140 A | * | 10/2000 | Yokote | 709/203 |
| 6,182,170 B1 | * | 1/2001 | Lee et al. | 709/217 |
| 6,216,152 B1 | * | 4/2001 | Wong et al. | 709/203 |
| 6,360,364 B1 | * | 3/2002 | Chen et al. | 711/171 |
| 6,544,126 B2 | * | 4/2003 | Sawano | 463/42 |

FOREIGN PATENT DOCUMENTS

| | | |
|---|---|---|
| DE | 36 45 218 | 3/1996 |
| DE | 297 14 588 | 11/1997 |
| WO | WO 91/04461 | 4/1991 |
| WO | WO 97/20274 | 6/1997 |
| WO | WO 97/32251 | 9/1997 |

OTHER PUBLICATIONS

PC Magazin, Jul. 1997, pp. 270–273, Michael Johann, "Allesönner" with English language translation.
Computer Design, Jul. 1997, "Java–based test & measurement kit".
c't, vol. 4, 1997, pp. 50–53, Dieter Brors "Vorsprung durch Technik", English language abstract enclosed.
Alcatel Telecommunications Review, 1/98, pp. 62–67, Vanderstraeten et al., "Software agents for advanced telecommunication services".
Computer, 6/97, pp. 115–117, Ram et al., "Enterprise Computing: The Java Factor".
1985 Gosling et al., "The Java language environment, a white paper", *Sun Microsystem Company*, Oct. 1985, pp. 10–85 XP002042922.

* cited by examiner

*Primary Examiner*—Wellington Chin
*Assistant Examiner*—Chuong Ho
(74) *Attorney, Agent, or Firm*—Merchant & Gould P.C.

(57) ABSTRACT

An electronic data-processing system for communicating with at least one other device wherein when a processing program and data are transmitted collectively from one electronic data-processing system to another electronic data-processing system.

19 Claims, 1 Drawing Sheet

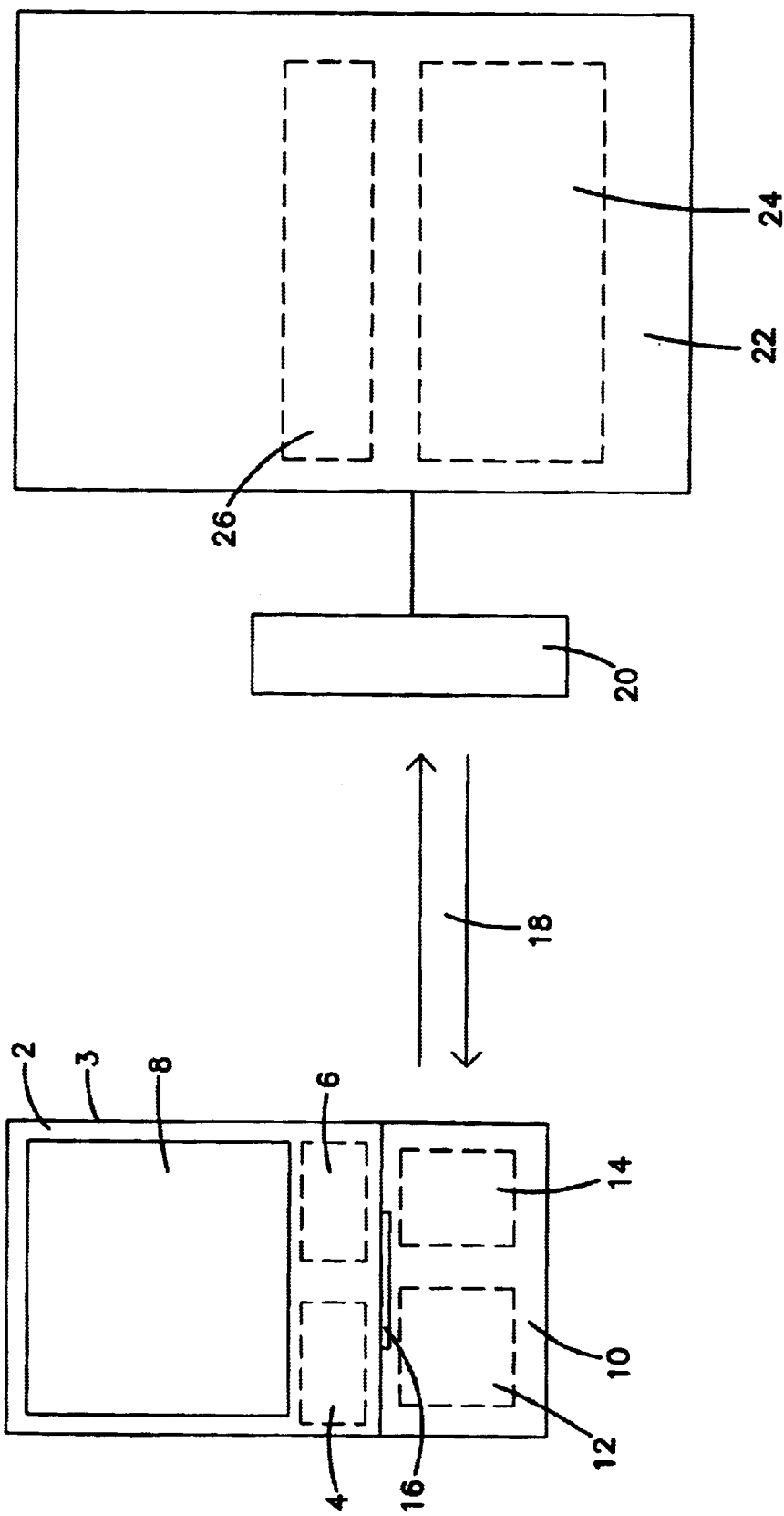

PROCESS AND ELECTRONIC DATA-PROCESSING SYSTEM FOR COMMUNICATION WITH AT LEAST ONE OTHER ELECTRONIC DATA-PROCESSING SYSTEM

TECHNICAL FIELD

The invention concerns a process for communication between a first electrode data-processing system and a second electronic data-processing system, as well as an electronic data-processing system for communication with at least one other electronic data-processing system, with a computing unit for processing data, a memory unit for storing data, a display unit for displaying data, an input unit for inputting data, a transmission unit for exchanging data with the second electronic data-processing system, and an interface for connecting the calculating unit to the transmission unit.

BACKGROUND

Such processes for communication and such electronic data-processing systems are known from the prior art. Here it is a matter, for example, of personal computers that communicate with each other via a normal telephone line with the aid of communicating program. In this case the communication program is found in each of the computers that are communicating with each other. Thus, it is typical, for example, to exchange messages between computers via telephone lines, a program for processing, e.g. a so-called e-mail program, being installed on each computer. Beyond that, it is also necessary that these e-mail programs be such that they are compatible with each other. For additional processing of the transmitted messages in the respective computers, it is further required that the computer in question contains appropriate programs for processing the transmitted messages. These can consist, for example, of graphics- or text-processing programs.

Thus, in the prior art is it disadvantageous necessary that for each computer the appropriate processing programs for processing the transmitted messages or information be already available.

This requires, in the prior art, that these computers have relatively large storage units for storing the necessary and frequently used processing programs. Furthermore, it is disadvantageous that fixed personal computers can perform their function only at their site. Meanwhile, it is true that very capable and mobile personal computers have been developed, e.g. laptops or notebooks; however, these portable personal computers are always relatively heavy and unweidly and, because of the further-required large storage capacity, very expensive.

Particularly disadvantages, specifically with the portable laptops and notebooks, is the fact that these computers are always too heavy and large to be carried continuously by a user in the hand or jacket, for example during a trade fair or exhibition or a visit to a tourist attention. Precisely in this situation, e.g. during a visit to a trade fair, it would be extremely advantageous to the specialist visitor to be able to refer at any time to data that, for example, a large, fixed electronic data-processing system has available.

SUMMARY

It is therefore the task of the invention to make available a process and an electronic data-processing system, for communication with at least one other electronic data-processing system, that avoid the above-specified disadvantages and allow the user to utilize all the usual data and data-processing programs even with only small dimensions and low storage capacity of the data-processing system.

The task is accomplished according to the invention, in a process of the type stated in the introduction, by the fact that during an accessing of data from the second electronic data-processing system by the first electronic data-processing system, at least one processing program for processing the transmitted data is also sent. In an electronic data-processing system for communicating with at least one other electronic data-processing system according to the type stated with the introduction, this task is accomplished through an electronic data-processing system [according to claim 10].

BRIEF DESCRIPTION OF THE DRAWING

FIG. 1 illustrates first and second electronic data-processing systems according to the present invention.

DETAILED DESCRIPTION

The advantages of the invention lie in particular in the fact that with the aid of the process according to she invention or with the aid of the electronic data-processing system according to the invention the appropriate processing program for using the transmitted data or information no longer must be kept available in the preferably portable, first electronic data-processing system. By virtue of the transmission of the processing or utility program for using the transmitted information, in each case-taking place directly before or directly after the transmission of the actual data or information, the first electronic data-processing system need only contain storage space sufficient for one utility or processing program. The storage capacity, and thus the weight and dimensions, of the first electronic data-processing system can in this manner be considerably reduced.

Consequently, it is possible to design the first electronic data-processing system to be light and small enough to be usable at any time by, for example, the above-mentioned trade-fair visitor, i.e., to be carried e.g. in the hand or the pocket of a jacket.

It is especially preferable that the processing program for using the transmitted data is likewise transmitted by the second electronic data-processing system to the first electronic data-processing system. However, it is also conceivable to transmit the processing program from a third electronic data-processing system, which, for example, is responsible only for this task.

It is especially preferable that, upon the accessing of the information from the second electronic data-processing system by the first electronic data-processing system, first data is transmitted by the first electronic data-processing system to the second electronic data-processing system, by means of which data the second electronic data-processing system is induced to transmit the processing program. This first data can be a matter of, for example, a command program understandable to the second electronic data-processing system, which program gives the second electronic data-processing system the command to transmit, shortly before or after the transmitted of the desired data or information, the corresponding processing program for processing and/or using the transmitted data or information. However, it is also conceivable that the second electronic data-processing system transmits to the first electronic data-processing system the corresponding processing program together with the desired date or information, automatically upon an accessing.

An additional preferred implementation [for] of the process according to the invention is distinguished by the fact that the first data represent an interactive program, for example an internet search program that is suitable for searching for data on the second electronic data-processing system. Here it is especially advantageous when this search program, which can be, for example, a web browser, can likewise search for and locate the processing program.

A further advantageous implementation form of the process according to the invention is characterized by the fact that the transmitted processing program for using the transmitted information is stored by the first electronic data-processing system only as long as necessary for the processing of the transmitted information. In this way the available storage space in the first electronic date-processing system is claimed only as long as necessary and, after the completion of the use of the transmitted data, is again free to receive new data or processing programs. Here it is of a particular advantage that the use determines, before the transmission or during the using of the transmitted data, how long the processing program is to be stored.

An especially advantageous implementation form of the electronic data-processing system according to the invention [in accordance with Claim 10] is distinguished by the fact the the transmission unit is detachable from the electronic data-processing system. The detachable transmission unit can be a matter of, for example, a mobile telephone or the like. This mobile telephone can be designed as active or passive. In the latter case, this passive mobile telephone is characterized with particular advantage by the fact that it is connectable to the electronic data-processing system as a plus-in module. In this case the passive mobile telephone is controlled advantageously by the electronic data-processing system, i.e. by the input equipment of the electronic data-processing system. The mobile telephone implemented as a plug-in module, which represents the transmission unit, can thus be designed especially small and light, since it must contain only those components necessary for the transmission of data, while the input and display components, which a mobile telephone normally includes, can be dispersed with.

A further preferred implementation form of the electronic data-processing system according to the invention is characterized by the fact that the electronic data-processing system is a portable personal computer, as for example a palmtop or notepad computer. Here is especially preferable that the input unit is implemented as a touch-sensitive viewing screen, so that the input and display units are united in the viewing screen. Thus, together with the passive, plug-in-module mobile telephone that can be designed very small, the first electronic data-processing system can be a very small notepad computer that can be easily carried in a jacket pocket or the hand and, at the same time, is not limited in its ability to process all transmitted information in a complete and user-friendly manner.

The transmitted information can be, for example, a city map. In that case, this city map, by means of the likewise transmitted processing and utility program, can be interactively used by the user of the portable first electronic data-processing system. Here, through the process according to the invention and/or the electronic data-processing system according to the invention, recourse can be advantageously made to the processing and utility program developed especially for this city map, since this program, according to the invention, is likewise transmitted to the first electronic data-processing system.

The communication or transmission of the data and programs from the second electronic data-processing system to the first electronic data processing system or the transmission of the data and programs from the electronic data-processing system to the second electronic data-processing system, as the case may be, takes place advantageously with the aid of DECT, GSM, or Ethernet systems that are standard in the prior art.

[Further advantageous implementation forms of the invention are specified in the dependent claims.]

An implementation form of the invention will be described with reference to the accompanying drawing.

The figure shows as a first electronic data-processing system a palmtop computer 2. The palmtop computer 2 exhibits a housing 3. Inside the housing are located a calculating unit 4 and a storage unit 6, represented with dashed lines. The palmtop computer 2 is operated through a touch-sensitive viewing screen 8, which serves simultaneously for the displaying and inputting of data. The palmtop computer 2 shows an interface 16 for the attachment of a transmission unit to be palmtop computer 2. In the drawing a plug-in module 10 is placed upon she interface 16. The plug-in module 10 can, for example, be further secured to the palmtop computer by means of fixing pins (not represented) that engages holes (not represented) in the palmtop computer 2.

The plug-in module 10 designed as a transmission unit displays a transmitter 12 ends a receiver 14 for transmitting and receiving data. The plug-in module 10 is a passive mobile telephone that is activated and operated via the touch-sensitive viewing screen 8. In the represented implementation form, the plug-in module 10 communicates with a transmitter and receiver 20 of a second electronic data-processing system 22 by aid of the GSM system 18. The second electronic date-processing system 22 likewise displays a calculating unit 24 and a storage unit 26.

According to the process in accordance with the invention, upon an activating by a user, through the touch-sensitive viewing screen 8, of the plug-in module 10 designed as a transmission unit, a request is sent via the GSM connection 18 to the second electronic data-processing system 22 for the transmission of data stored in the storage unit 26 of the second electronic data-processing system 22. Simultaneously with the transmission of the request to the second electronic data-processing system, the palmtop computer 2 designed as the first electronic data-processing system transmits, by aid of the transmission unit 10 and the GSM system 18, to the second electronic data-processing system 22 the command to also call up the appropriate processing program from the storage unit 26 and send this to the palmtop computer 2. Thus, in addition to she desire data, the electronic data-processing system 22 also transmits from the storage unit 26 to the palmtop computer 2 she processing or utility program corresponding to these data, by aid of the transmission and receiving unit 20 and the GSM system 18. Thus, upon the conclusion of the communication the desired data and information are present in the storage unit B of the palmtop computer 2, as well as the corresponding processing and utility program for processing and using the transmitted data.

What is claimed is:

1. Electronic data-processing system for communication with at least one other electronic data-processing system, with a calculating unit for processing data,
with a storage unit for storing data,
with a display unit for displaying data,
with an input unit for inputting data,
with a transmission unit for exchanging data with the second electronic data-processing system,
with an interface for connecting the calculating unit to the transmission unit, characterized by the fact that:
- (a) first data is stored in the storage unit and upon the activation of the transmission unit for accessing the second data from the second electronic data-processing system, said first data is transmitted to the second electronic data-processing system, and said second data and at least one processing program for processing the second data are transmitted collectively from the second electronic data-processing system to the first electronic data-processing system,
- (b) the transmission unit is adapted for coupling with the first electronic data-processing system and the transmission unit is provided with a sending unit and a receiving unit for sending and receiving said first and second data;
- (c) the first electronic data-processing system is sized to be transported in a usual jacket pocket;
- (d) said transmission unit is controlled via the input unit of said first electronic data-processing system; and
- (e) the second data contains information relating to a geographic area and the user of the first electronic data-processing system can operate the first electronic data-processing system for the reproduction of information concerning the geographic area and the information makes it possible for the user to provide orientation in the geographic area.

2. Process according to claim 1, characterized by the fact that the processing program is transmitted from the second electronic data-processing system to the first electronic data-processing system.

3. Process according to claim 2, characterized by the fact that upon the accessing of the second electronic data-processing system, first data are transmitted from the first electronic data-processing system to the second electronic data-processing system, by which transmission of first data the second electronic data-processing system is needed to transmit the processing program.

4. Process according to claim 3, characterized by the fact that the first data consist of at least one command program that is understandable to the second electronic data-processing system.

5. Process according to claim 3, characterized by the fact that the first data are an interactive program for searching for the data and the processing program to the second electronic data-processing system.

6. Process according to claim 1, characterized by the fact that the processing program(s) for processing the transmitted data is/are stored by the first electronic data-processing system only as long as necessary for the processing of the transmitted data.

7. Process according to claim 1, characterized by the fact that the processing program(s) for processing the transmitted second data is/are stored by the first electronic data-processing system only as long as predetermined by the user of the first electronic data-processing system.

8. Process according to claim 1, characterized by the fact that the transmitted data are a city map, a schedule for public transit, or trade fair information, and that the processing program is a program for processing the transmitted data and for operation and interactive accessing by a user.

9. Electronic data-processing system according to claim 1, characterized by the fact that the first data are at least one command program that commands the second electronic data-processing system to transmit the processing program for the second data upon the transmission of the second data.

10. Electronic data processing system according to claim 1, characterized by the fact that the activation of the transmission unit by the user of the electronic data-processing system takes place by aid of the input unit, the calculating unit, the storage unit, and the interface.

11. Electronic data processing system according to claim 1, characterized by the fact that the transmission unit is detachable from the electronic data-processing system.

12. Electronic data processing system according to claim 1, characterized by the fact that the transmission unit is a mobile telephone.

13. Electronic data processing system according to claim 12, characterized by the fact that the mobile telephone is attachable to the electronic data-processing system as a plug-in module.

14. Electronic data processing system according to claim 13, characterized by the fact the the plug-in module is controllable through the electronic data processing system.

15. Electronic data-processing system according to claim 1, characterized by the fact that the electronic data-processing system is a portable person computer.

16. Electronic data-processing system according to claim 1, characterized by the fact that the input unit is a touch-sensitive viewing screen.

17. Electronic data-processing system according to claim 1, characterized by the fact that the second data are a city plan, a schedule for public transit, trade show information, or tourist information.

18. Electronic data-processing system according to claim 1, characterized by the fact that the processing program is an e-mail program.

19. Electronic data-processing system according to claim 1, characterized by the fact that the electronic data-processing system communicates with the second electronic data-processing system by aid of the DECT, GSM, or Ethernet system.

* * * * *